US012643798B2

(12) United States Patent
Zhong et al.

(10) Patent No.: US 12,643,798 B2
(45) Date of Patent: Jun. 2, 2026

(54) LITHIUM-SUPPLEMENTING ADDITIVE, PREPARATION METHOD AND APPLICATION THEREOF

(71) Applicant: SHENZHEN DYNANONIC INNOVAZONE NEW ENERGY TECHNOLOGY CO., LTD., Shenzhen (CN)

(72) Inventors: Zeqin Zhong, Shenzhen (CN); Yuanxin Wan, Shenzhen (CN); Lingyong Kong, Shenzhen (CN); Zhongke Zhao, Shenzhen (CN); Chengben Zhu, Shenzhen (CN); Wen Zhong, Shenzhen (CN); Xianyinan Pei, Shenzhen (CN)

(73) Assignee: SHENZHEN DYNANONIC INNOVAZONE NEW ENERGY TECHNOLOGY CO., LTD., Shenzhen (CN)

( * ) Notice: Subject to any disclaimer, the term of this patent is extended or adjusted under 35 U.S.C. 154(b) by 508 days.

(21) Appl. No.: 18/038,917

(22) PCT Filed: Oct. 20, 2022

(86) PCT No.: PCT/CN2022/126438
§ 371 (c)(1),
(2) Date: May 25, 2023

(87) PCT Pub. No.: WO2023/071912
PCT Pub. Date: May 4, 2023

(65) Prior Publication Data
US 2024/0208837 A1 Jun. 27, 2024

(30) Foreign Application Priority Data

Oct. 27, 2021 (CN) .......................... 202111256908.5

(51) Int. Cl.
*C01G 23/00* (2006.01)
*H01M 4/36* (2006.01)
(Continued)

(52) U.S. Cl.
CPC .......... *C01G 23/002* (2013.01); *H01M 4/364* (2013.01); *H01M 4/485* (2013.01);
(Continued)

(58) Field of Classification Search
None
See application file for complete search history.

(56) References Cited

U.S. PATENT DOCUMENTS

2020/0127265 A1 4/2020 Min et al.
2021/0126241 A1* 4/2021 Wang .................... H01M 4/134

FOREIGN PATENT DOCUMENTS

CN 107819113 A 3/2018
CN 108511758 A 9/2018
(Continued)

OTHER PUBLICATIONS

Machine Translation of CN110993949 (Year: 2020).*
Zhao J et al., Research on pre-lithiation technology for lithium-ion batteries.

*Primary Examiner* — Wyatt P Mcconnell
(74) *Attorney, Agent, or Firm* — Brooks Kushman P.C.

(57) ABSTRACT

A lithium-supplementing additive, a preparation method therefor and application thereof. The lithium-supplementing additive includes a core body and a functional encapsulation layer coated on the core body, and the core body includes a lithium-supplementing material. Lithium carbonate is dispersed in the interface between the functional encapsulation layer and the core body or/and in the functional encapsulation layer. In the lithium-supplementing additive of the present application, the lithium carbonate dispersed in the (Continued)

interface between the functional encapsulation layer and the core body or/and in the functional encapsulation layer has a synergistic effect with the functional encapsulation layer, and can effectively improve the effect of the functional encapsulation layer on the core body, so that the core body is isolated from ambient moisture and $CO_2$ to ensure the stability of the core body, thereby ensuring the effect and stability of lithium supplementation of the lithium-supplementing additive.

18 Claims, 5 Drawing Sheets

(51) Int. Cl.
    H01M 4/485     (2010.01)
    *H01M 4/02*     (2006.01)

(52) U.S. Cl.
    CPC ...... *C01P 2002/08* (2013.01); *C01P 2002/72* (2013.01); *C01P 2004/03* (2013.01); *C01P 2004/51* (2013.01); *C01P 2004/61* (2013.01); *C01P 2004/62* (2013.01); *C01P 2004/64* (2013.01); *C01P 2004/84* (2013.01); *C01P 2006/12* (2013.01); *C01P 2006/40* (2013.01); *H01M 2004/027* (2013.01); *H01M 2004/028* (2013.01)

(56) References Cited

FOREIGN PATENT DOCUMENTS

| | | | |
|----|------------|----|---------|
| CN | 109786746 | A | 5/2019 |
| CN | 110459748 | A | 11/2019 |
| CN | 110993949 | * | 4/2020 |
| CN | 111193019 | A | 5/2020 |
| CN | 112054204 | A | 12/2020 |
| CN | 112490415 | A | 3/2021 |
| CN | 112635720 | A | 4/2021 |
| CN | 112713275 | A | 4/2021 |
| CN | 112951620 | A | 6/2021 |
| CN | 113036106 | A | 6/2021 |
| CN | 113526561 | A | 10/2021 |
| KR | 20150040105 | A | 4/2015 |
| WO | 2021109965 | A1 | 6/2021 |

* cited by examiner

LITHIUM-SUPPLEMENTING ADDITIVE, PREPARATION METHOD AND APPLICATION THEREOF

CROSS-REFERENCE TO RELATED APPLICATIONS

This application is a U.S. national phase of International Patent Application No. PCT/CN2022/126438 with an international filing date of Oct. 20, 2022, designating the U.S., now pending, and further claims the benefit of Chinese patent application No. 202111256908.5, titled "Lithium-supplementing additive, preparation method and application thereof" filed on Oct. 27, 2021, the entire contents of which are incorporated herein by reference.

TECHNICAL FIELD

The present application relates to the field of secondary batteries, and in particular, to a lithium-supplementing additive, a preparation method, and application thereof.

BACKGROUND

The oil energy crisis in the 1960s and 1970s forced people to look for new alternative energy sources. With an increased awareness of environmental protection and the energy crisis, lithium-ion batteries are considered to be one of the most promising energy sources due to their high operating voltage and energy density, relatively small self-discharge level, no memory effect, no pollution from heavy metal elements such as lead and cadmium, and long cycle life.

During the initial charging process of a lithium-ion battery, the surface of the anode is usually accompanied by the formation of a solid electrolyte film (SEI). This process consumes a large amount of $Li^+$, which means that part of the $Li^+$ released from the cathode material is irreversibly consumed, corresponding to the reduction in the reversible specific capacity of the cell. Anode materials, especially silicon-based anode materials, will further consume $Li^+$, resulting in the loss of lithium in cathode materials, thereby reducing the initial Coulombic efficiency and capacity of the battery. For example, in a lithium-ion battery system using a graphite anode, about 10% of the lithium source will be consumed in the initial charging process. The consumption of lithium sources in the cathode will be further aggravated when anode materials with a high specific capacity, such as alloys (silicon, tin, etc.), oxides (silicon oxide, tin oxide), and amorphous carbon anodes, are used.

In order to improve the low Coulombic efficiency caused by the irreversible loss at the anode, apart from pre-lithiation of the anode material and electrode piece, a high energy density can also be achieved by supplementing lithium to the cathode. For example, the lithium-rich iron-based materials currently known have a theoretical capacity as high as 867 mAh/g, and a working voltage window that is consistent with that of conventional lithium-ion batteries, furthermore, as lithium-supplementing additives with broad prospects, they basically do not participate in the electrochemical process in the later stage. In another disclosed cathode lithium-supplementing material $Li_5FeO_4$, it is prepared by the sol-gel method. This material is used as a cathode lithium-supplementing material for lithium-ion batteries with the characteristics of high charge capacity and small discharge capacity. However, the material has poor environmental adaptability, as well as a large amount of surface residual alkali that is difficult to process. In yet another disclosed carbon-coated lithium ferrite material, the external environment is isolated by the gas-phase coating of the carbon source, and lithium ferrite is protected from contact with water in the air to improve the stability of the material; however, complete isolation from the contact with water in the air by the coating layer is difficult, which results in material deterioration and failure. Moreover, residual alkali still exists in the coating layer or between the interface with the lithium ferrite core body, making it difficult to process.

SUMMARY

This application provides a lithium-supplementing additive and a preparation method therefor, overcoming the problem of the unstable lithium supplement or the high content of residual alkali in the existing lithium-supplementing additives, which leads to unsatisfactory lithium supplement effect and processability.

The present application further provides an electrode sheet and a secondary battery having the electrode sheet, which overcomes the unsatisfactory initial Coulombic efficiency and battery capacity of existing secondary batteries.

A first aspect of the present application provides a lithium-supplementing additive, including: a core body and a functional encapsulation layer coated on the core body. The core body includes a lithium-supplementing material, and lithium carbonate is dispersed at an interface between the functional encapsulation layer and the core body or/and in the functional encapsulation layer.

Further, lithium carbonate accounts for 0.2-1.5 wt % of the functional encapsulation layer.

Further, lithium carbonate accounts for 0.5-1.5 wt % of the functional encapsulation layer.

Further, a content of lithium carbonate at the interface between the functional encapsulation layer and the core body and/or in a surface layer of the functional encapsulation layer in contact with the core body is greater than a content thereof in a surface layer away from the core body.

Further, the lithium-supplementing material includes at least one element of lithium-rich transition metal oxides, $Li_wA$, $Li_{1+x+y}Al_xM_yN_zTi_{2-x-y-z}(PO_4)_3$, and lithium metal; where $0<w\leq5$, A is at least one element of C, N, O, P, S, F, B, and Se, N is at least one selected from Si, Ge, and Sn, M is at least one selected from Sc, Ga, Y, and La, and at least one of $0\leq y\leq0.5$, $0\leq z\leq0.5$, $0\leq x+y\leq0.5$.

Further, the lithium-supplementing material includes at least one having a chemical formula of: $Li_2MnO_2$, $Li_6MnO_4$, $aLiFeO_2\cdot bLi_2O\cdot cM_xO_y$, $Li_6CoO_4$, $Li_2NiO_2$, $Li_4SiO_4$, $Li_2S$, $Li_3N$, $Li_8SnO_6$, and $Li_{1.3}Al_{0.3}Ti_{1.7}(PO_4)_3$; where in the formula $aLiFeO_2\cdot bLi_2O\cdot cM_xO_y$, $a+b\geq0.98$, $c\leq0.02$, $1.8\leq b/a\leq2.1$, $1\leq y/x\leq2.5$, and M is at least one of Ni, Co, Mn, Ti, Al, Cu, V, and Zr.

Further, a particle size of the core body may be 50 nm-10 μm.

Further, the functional encapsulation layer includes a hydrophobic encapsulation layer.

Further still, the hydrophobic encapsulation layer includes a conductive carbon coating layer, and lithium carbonate is distributed in the conductive carbon coating layer and the interface in contact with the core body.

Further, a particle size of the lithium-supplementing material is 0.2 μm≤D50≤10 μm, D10/D50≥0.3, D90/D50≤2.

Further, a specific surface area of the lithium-supplementing material is 0.5≤BET≤20 m²/g.

Further, a resistivity of the lithium-supplementing material is 1.0-500 Ω/cm.

A second aspect of the present application provides a preparing method for the lithium-supplementing additive of the present application. The preparing method for the lithium-supplementing additive of the present application includes the following steps:

mixing a precursor of a first core-body material or the first core-body material with a precursor of a first functional encapsulation layer to form a first mixture in a first mixing treatment; sintering the first mixture in a protective atmosphere to obtain a composite of the first functional encapsulation layer coated on the core material in a first sintering treatment; and carrying out a first heat treatment in an environment containing a first carbon source to form lithium carbonate in the first functional encapsulation layer to obtain the lithium-supplementing additive; the precursor of the first core-body material includes a precursor of a first lithium-supplementing material;

or providing a second core-body material including a second lithium-supplementing material, and coating a second functional encapsulation layer on a surface of the second core-body material; and carrying out a second heat treatment in an environment containing a second carbon source to form lithium carbonate in the second functional encapsulation layer to obtain the lithium-supplementing additive.

Further, the first carbon source and/or the second carbon source include at least one of carbon dioxide, $C_1$-$C_4$ alcohols, $C_1$-$C_4$ ethers, $C_1$-$C_4$ ketones, and $C_1$-$C_4$ hydrocarbon compounds.

Further, a temperature of the first sintering treatment is 450° C.-1000° C., and a duration thereof is 0.5-10 hrs.

Further, the temperature of the first sintering treatment increases to 450° C.-1000° C. at a rate of 100-500° C./h.

Further, a temperature of the first heat treatment and/or second heat treatment is 400-800° C., and a duration thereof is 2-10 hrs.

A third aspect of the present application provides an electrode sheet, including a current collector and an electrode active layer bonded to a surface of the current collector. The electrode active layer is doped with the lithium-supplementing additive of the present application or a lithium-supplementing additive prepared by the preparation method of the present application.

A fourth aspect of the present application provides a secondary battery, including a cathode sheet and an anode sheet. The cathode sheet or the anode sheet is an electrode sheet.

The present application has the following advantageous effects compared to existing technologies:

The lithium-supplementing additive of the present application includes the core body having the lithium-supplementing material so that abundant lithium can be supplied as a "sacrificial agent" during the initial charging process, and lithium ions can be released as much as possible at one time to compensate for the irreversible loss of the lithium ions due to the formation of the SEI film at the anode. The abundance of lithium ions in the battery improves the initial efficiency and the overall electrochemical performance of the battery. At the same time, in the lithium-supplementing additive of the present application, lithium carbonate is distributed in the interface of the functional encapsulation layer and the core body or/and within the functional encapsulation layer, which results in a synergistic effect with the functional encapsulation layer and effectively improves the effect of the functional encapsulation layer on the core body.

Therefore, the core body is isolated from moisture and carbon dioxide in the external environment, and the stability of the core body is ensured, thereby ensuring the lithium supplementation effect and the stability of lithium supplementation of the lithium-supplementing additive. Moreover, the residual alkali content in the functional encapsulation layer is lowered, which allows an excellent processibility of the lithium-supplementing additive of the present application.

The preparation method of the lithium-supplementing additive of the present application can effectively prepare the lithium-supplementing additive having a core-shell structure, and allows the functional encapsulation layer to effectively coat the core body containing the lithium-supplementing material. The lithium-supplementing additive prepared has a low residual alkali content or even eliminates the residual alkali content, and contains lithium carbonate with a dense functional encapsulation layer, so the lithium-supplementing additive prepared has excellent lithium supplement effect, stable lithium supplement performance, and good processibility. In addition, the preparation method of the lithium-supplementing additive can ensure a stable structure and electrochemical performance, high efficiency, and low production costs of the lithium-supplementing additive.

The electrode sheet of the present application contains the lithium-supplementing additive of the present application, therefore, the composition in the electrode active layer of the electrode sheet is uniformly dispersed, and the film quality is high, giving rise to the excellent electrochemical performance of the electrode sheet. Moreover, during the charge and discharge process, the lithium-supplementing additive included therein can serve as a lithium source and a "sacrificial agent" during the initial charging cycle to compensate for the irreversible consumption of lithium ions by the formation of the SEI film on the anode, thereby maintaining the abundance of lithium ions in the battery system and improves the initial efficiency and the overall electrochemical performance of the battery.

The secondary battery of the present application includes the electrode sheet, therefore, the lithium-ion battery has excellent initial Coulombic efficiency, battery capacity and cycle performance, long service life, and stable electrochemical performance.

BRIEF DESCRIPTION OF THE DRAWINGS

In order to more clearly illustrate the detailed embodiments of the present application or technical proposals in the existing technology, accompanying drawings that are used in the description of the embodiments or existing technologies are briefly introduced hereinbelow. It is understood that the drawings in the following description are merely some embodiments of the present application. For those skilled in the art, other drawings can also be obtained according to these drawings without any creative effort.

DETAILED DESCRIPTION OF THE EMBODIMENTS

Figure 1:
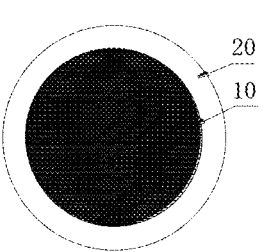
FIG. 1 is a schematic diagram showing the structure of the lithium-supplementing additive of an embodiment of the present application.

In order to make the purpose, technical proposals, and advantages of the present application more clearly understood, the present application will be described in further detail hereinbelow with reference to the accompanying drawings and embodiments. It should be understood that the specific embodiments described herein are merely used to explain the present application, but not to limit the present application.

In this application, the term "and/or", which describes the relationship between related objects, means that there can be three relationships, for example, A and/or B, which can represent circumstances that A exists alone, A and B exist at the same time, and B exists alone, where A and B can be singular or plural. The character "/" generally indicates that the associated objects are in an "or" relationship.

In this application, "at least one" means one or more, and "a plurality of" means two or more. "At least one item below" or similar expressions refer to any combination of these items, including any combination of single item or plural items. For example, "at least one of a, b, or c" can mean: a, b, c, a-b (i.e., a and b), a-c, b-c, or a-b-c, where a, b, and c can be singular or plural respectively.

It should be understood that, in various embodiments of the present application, the numbers of the above-mentioned processes do not imply the sequence of execution, some or all of the steps may be executed in parallel or sequentially, and the execution sequence of each process should be based on its functions and determined by the internal logic, and should not constitute any limitation on the implementation process of the embodiments of the present application.

The terms used in the embodiments of the present application are merely for the purpose of describing specific embodiments, and are not intended to limit the present application. Unless clearly dictated otherwise, the singular forms "a", "the" and "said" as used in the embodiments of this application and the appended claims intended to include the plural forms as well.

The weight of the relevant compositions mentioned in the examples of this application can not only refer to the specific content of each composition, but also represent the proportional relationship between the weights of the compositions. It is within the scope disclosed in the embodiments of the present application that the content of the compositions is proportionally scaled up or down. Specifically, the mass described in the description of the embodiments of the present application may be a mass unit known in the chemical field, such as $\mu g$, mg, g, and kg.

The terms "first" and "second" are merely used for descriptive purposes to distinguish objects such as substances from each other, and cannot be understood as indicating or implying relative importance or implying the number of indicated technical features. For example, without departing from the scope of the embodiments of the present application, "the first" may also be referred to as "the second", and similarly, "the second" may also be referred to as "the first". Thus, a feature defined as "first" or "second" may expressly or implicitly include one or more of the features.

In a first aspect, embodiments of the present application provide a lithium-supplementing additive, which includes a core body and a functional encapsulation layer coating the core body, that is, the lithium-supplementing additive of the embodiments of the present application has a core-shell structure. The structure of the lithium-supplementing additive according to the embodiments of the present application include a core body 10 and a functional encapsulation layer 20 coated on the core body 10, as shown in FIGS. 1-5.

The core body 10 contains a lithium-supplementing material, namely, the core body 10 serves as a lithium source for lithium supplement according to the embodiments of the present application. The core body 10 is rich in lithium so that the lithium-supplementing additive is added to electrodes as an additive and supplies abundant lithium. The lithium-supplementing additive serves as a "sacrificial agent" during the initial charging process, such that lithium ions can be released as much as possible at one time to compensate for the irreversible loss of the lithium ions due to the formation of the SEI film at the anode.

Moreover, the lithium-supplementing material contained in the core body 10 may be a conventional lithium-supplementing material, or a newly developed lithium-supplementing material. Herein, the lithium-supplementing material may be a ternary lithium-supplementing material or a binary lithium-supplementing material. For example, the lithium-supplementing material may include, but is not limited to, at least one of lithium-rich transition metal oxides, $Li_wA$, $Li_{1+x+y}Al_xM_yN_zTi_{2-x-y-z}(PO_4)_3$, where $0<w\le5$, A is at least one element of C, N, O, P, S, F, B, and Se, N is selected from at least one of Si, Ge, and Sn, M is selected from at least one of Sc, Ga, Y, and La, and at least one of $0\le y\le0.5$, $0\le z\le0.5$, $0\le x+y\le0.5$. In some detailed embodiments, the lithium-supplementing material may include, but not limited to, at least one having the chemical formula of $Li_2MnO_2$, $Li_6MnO_4$, $aLiFeO_2 \cdot bLi_2O \cdot cM_xO_y$, $Li_6CoO_4$, $Li_2NiO_2$, $Li_4SiO_4$, $Li_2S$, $Li_3N$, $Li_8SnO_6$, and $Li_{1.3}Al_{0.3}Ti_{1.7}(PO_4)_3$; where in the formula $aLiFeO_2 \cdot bLi_2O \cdot cM_xO_y$, $a+b\ge0.98$, $c\le0.02$, $1.8\le b/a\le2.1$, $1\le y/x\le2.5$, and M is at least one of Ni, Co, Mn, Ti, Al, Cu, V, and Zr. These lithium-supplementing materials are rich in lithium, and can release lithium ions during the initial cycle of charging to effectively supplement lithium. In addition, the lithium-supplementing material of the core body 10 may be an anode lithium-supplementing material or a cathode lithium-supplementing material. When the lithium-supplementing material is a cathode lithium-supplementing material, the lithium-supplementing additive in the embodiment of the present application is a cathode lithium-supplementing additive. When the lithium-supplementing material is an anode lithium-supplementing material, the lithium-supplementing additive in the embodiment of the present application is an anode lithium-supplementing additive, specifically such as a lithium-metal micropowder core body and a passivated coating layer doped with lithium carbonate, where metallic lithium as the lithium-supplementing material of the core body 10, and the coating layer doped with lithium carbonate as the functional encapsulation layer 20 or as a layer structure of the functional encapsulation layer 20.

In the embodiments, the core body 10 may be at least one of a primary particle and a secondary particle, and specifically may be at least one of a primary particle and a secondary particle formed by the lithium-supplementing material contained in the core body 10. In the embodiments, the particle size of the core body 10 may be 50 nm-15 μm, further may be 50 nm-10 μm. For example, when the core body 10 is a primary particle, the particle size distribution of the primary particle, namely the particle size distribution of the core body 10, is 50 nm-5 μm; when the core body 10 is a secondary particle, the particle size distribution of the secondary particle, namely the particle size distribution of the core body 10, is 200 nm-15 μm, further 200 nm-10 μm. Secondary particles refer to agglomerated particles formed by the aggregation of more than one primary particle. By controlling the particle size and particle shape of the core body 10, the processability of the lithium-supplementing additive in the preparation of lithium battery slurry can be improved in addition to its ability to provide abundant lithium ions, furthermore, the smaller primary particles size can also release more lithium.

In addition, although the lithium-supplementing material contained in the core body 10 in the above-mentioned embodiments is rich in lithium, however, the core body is unstable when in contact with water and carbon dioxide, and it is easy to react with water and carbon dioxide, thereby reducing lithium supplementing effect of the lithium-supplementing additive in the embodiments of the present application. At the same time, lithium-supplementing materials are generally rich in residual alkalis formed during processing, and these residual alkalis will further reduce their processability. For example, the viscosity of the slurry containing the above lithium-supplementing materials will increase dramatically, and the gel will lose fluidity rapidly, so that subsequent processing cannot be performed. Therefore, based on the core body 10 in the above-mentioned embodiments, the functional encapsulation layer 20 contained in the lithium-supplementing additive in the above-mentioned embodiments is coated on the core body 10 to form a complete coating layer, and lithium carbonate is dispersed at the interface between the functional encapsulation layer 20 and the core body 10 or/in the functional encapsulation layer 20. Therefore, in the presence of lithium carbonate, the functional encapsulation layer 20 can effectively protect the core body 10, so that the core body 10, specifically the lithium-supplementing material, is isolated from moisture and carbon dioxide in the ambient environment. Due to the presence of lithium carbonate, the content of residual alkali in the functional encapsulation layer 20 can be at least effectively reduced or substantially eliminated, thereby effectively avoiding the problems in the processing caused by residual alkali, that is, enabling an excellent processibility of the lithium-supplementing material in the embodiments of the present application. Moreover, the lithium carbonate and the functional encapsulation layer 20 have a synergistic effect, which can effectively improve the influence of the functional encapsulation layer 20 on the core body 10, which isolates the core body 10 from moisture and carbon dioxide in the ambient environment, so that the stability of the core body 10 is ensured, thereby ensuring the lithium-supplementing effect and the stability of lithium-supplementing additives, and stimulating the specific capacity of lithium-supplementing additives.

In the embodiments, lithium carbonate accounts for the 0.2-1.5 wt % of functional encapsulation layer 20, and in a further embodiment, the content of lithium carbonate is typically but not limited to 0.5-1.5 wt %, specifically can be 0.2 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, and 1.5 wt %. By controlling the content of lithium carbonate to further reduce the content of residual alkali in the lithium-supplementing additive, especially the content of residual alkali in the functional encapsulation layer 20, the processability of the lithium-supplementing additive in the embodiments of the present application is further improved, and at the same time the lithium-supplementing effect and the stability of lithium-supplementing additive are enhanced, the conductivity of the functional encapsulation layer 20 is increased, and the specific capacity of the lithium-supplementing additive is stimulated.

In addition, lithium carbonate may be distributed mainly or only at the interface between the functional encapsulation layer 20 and the core body 10, or may be mainly distributed in functional encapsulation layer 20. In the embodiments of the present application, lithium carbonate is mainly distributed at the interface of the functional encapsulation layer 20 and the core body 10, while spreading in the functional encapsulation layer 20.

In an embodiment, the content of lithium carbonate at the interface between the functional encapsulation layer 20 and the core body 10 and/or in a surface layer of the functional encapsulation layer 20 contacting with the core body 10 is greater than that in a surface layer away from the core body 10 (that is, an outer surface layer of the functional encapsulation layer 20). Specifically, the distribution of lithium carbonate in the functional encapsulation layer 20 is such that the content of lithium carbonate gradually decreases from the surface of the functional encapsulation layer 20 close to the core body 10 to its outer surface, that is, the content of lithium carbonate gradually decreases as the lithium carbonate spread out in the direction from the inner surface to the outer surface of the functional encapsulation layer 20. This distribution of lithium carbonate can effectively reduce the content of residual alkali in the lithium-supplementing additive and effectively improve the influence of the functional encapsulation layer 20 on the core body 10, which isolates the core body 10 from moisture and carbon dioxide in the ambient environment, thereby enhancing the lithium-supplementing effect and the stability of lithium supplement.

Based on the above-mentioned effect of the functional encapsulation layer 20, the material of the functional encapsulation layer 20 may be to be a material having the effect of isolating moisture content and carbon dioxide. In an embodiment, for example, the functional encapsulation layer 20 includes a hydrophobic encapsulation layer, the material thereof may include at least one of ceramics, carbon materials, oxides, and the like. The functional encapsulation layer 20 may also be a composite layer structure.

In an embodiment, the hydrophobic encapsulation layer includes a conductive carbon coating, and lithium carbonate is distributed in the conductive carbon coating as well as on its interface in contact with the core body 10.

Further, since the functional encapsulation layer 20 is coated on the core body 10, therefore, when the lithium-supplementing material contained in the core body 10 releases lithium ions during the initial charging process, the lithium ions need to pass through the functional encapsulation layer 20. In light of this, the electrochemical performance and thickness of the functional encapsulation layer 20 will also affect the extraction and migration efficiency of lithium ions. Therefore, the functional encapsulation layer 20 ideally has good ion conductivity apart from insulating moisture and carbon dioxide and other unfavorable factors. In an embodiment, the functional encapsulation layer 20 may include an ionic conductor encapsulation layer.

In addition, also based on that the functional encapsulation layer 20 is coated on the surface of the core body 10, its conductivity will also affect the electrochemical properties such as the rate and the initial efficiency of the battery during the lithium supplement by the lithium-supplementing additive or thereafter. Therefore, the functional encapsulation layer 20 can ideally have good electronic conductivity properties apart from insulating moisture, carbon dioxide, and other unfavorable factors. In an embodiment, the functional encapsulation layer 20 may include an electronic conductor encapsulation layer.

Figure 2:
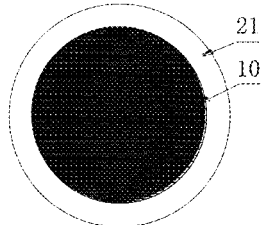
FIG. 2 is a schematic diagram showing the structure of the lithium-supplementing additive shown in FIG. 1 having a functional encapsulation layer including a hydrophobic encapsulation layer.

Therefore, as an embodiment of the present application, the functional encapsulation layer 20 contained in the lithium-supplementing additive may include at least one of a hydrophobic encapsulation layer, an ionic conductor encapsulation layer, and an electronic conductor encapsulation layer. Accordingly, lithium carbonate may be dispersed in at least one of the hydrophobic encapsulation layer, the ionic conductor encapsulation layer, and the electronic conductor encapsulation layer, specifically, in the coating layer close to the core body 10. Optionally, the functional encapsulation layer 20 has at least the following structure:

In an embodiment, as shown in FIG. 2, the functional encapsulation layer 20 includes a hydrophobic encapsulation layer 21.

Figure 3:
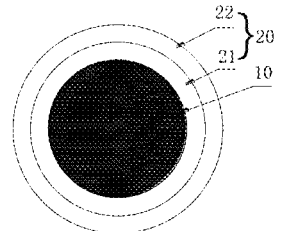
FIG. 3 is a schematic diagram showing the structure of the lithium-supplementing additive shown in FIG. 1 having a functional encapsulation layer including a hydrophobic encapsulation layer and an electronic conductor encapsulation layer.

In another embodiment, as shown in FIG. 3, the functional encapsulation layer 20 includes a hydrophobic encapsulation layer 21 coated on the core body 10 and an electronic conductor encapsulation layer 22 coated on the outer surface of the hydrophobic encapsulation layer 21.

Figure 4:
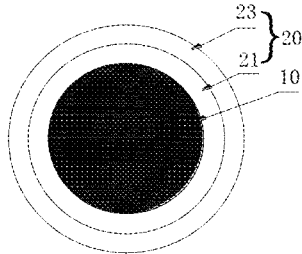
FIG. 4 is a schematic diagram showing the structure of the lithium-supplementing additive shown in FIG. 1 having a functional encapsulation layer including a hydrophobic encapsulation layer and an ionic conductor encapsulation layer.

In yet another embodiment, as shown in FIG. 4, the functional encapsulation layer 20 includes a hydrophobic encapsulation layer 21 coated on the core body 10 and an ionic conductor encapsulation layer 23 coated on the outer surface of the hydrophobic encapsulation layer 21.

Figure 5:
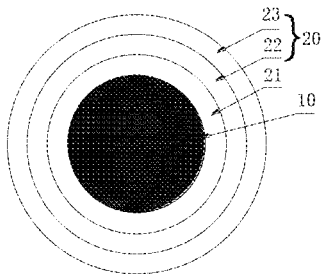
FIG. 5 is a schematic diagram showing the structure of the lithium-supplementing additive shown in FIG. 1 having a functional encapsulation layer including a hydrophobic encapsulation layer, an electronic conductor encapsulation layer, and an ionic conductor encapsulation layer.

In still another embodiment, as shown in FIG. 5, the functional encapsulation layer 20 includes the hydrophobic encapsulation layer 21 coated on the core body 10 and an electronic conductor encapsulation layer 22 and an ionic conductor encapsulation layer 23 coated on the outer surface of the hydrophobic encapsulation layer 21.

Of course, the functional encapsulation layer may also be a composite structure layer formed by other combinations of the hydrophobic encapsulation layer, the ionic conductor encapsulation layer, and the electronic conductor encapsulation layer.

The electronic conductor encapsulation layer 22 additionally provided in the above-mentioned functional encapsulation layer 20 can improve the electron conductivity of the functional encapsulation layer 20, thereby improving the electron conductivity of the lithium-supplementing additive and reducing the impedance in the electrode. At the same time, during and after the release of the core body 10 as a "sacrificial agent", the electronic conductor encapsulation layer 22 can be exploited for a second time as an auxiliary conductive agent in the electrode. Based on the effect of the electronic conductor encapsulation layer 22, when the functional encapsulation layer 20 only includes the electronic conductor encapsulation layer 22, the electronic conductor encapsulation layer 22 should have a dense structure and provide full coverage. When the functional encapsulation layer 20 at least includes an electronic conductor encapsulation layer 22 and an ionic conductor encapsulation layer 23, the electronic conductor encapsulation layer 22 may be may have partial coverage or a non-dense structure, but the composite coating layer constituted by the electronic conductor encapsulation layer 22 and the ionic conductor encapsulation layer 23 should have the function of preventing harmful compositions such as moisture and carbon dioxide.

In the embodiments, the thickness of the electronic conductor encapsulation layer 22 is 1-100 nm, further is 1-50 nm, and further still is 2-20 nm. In other embodiments, the mass content of the electronic conductor encapsulation layer 22 in the lithium-supplementing additive is 0.1-30%, further 0.1-10%, more preferably 0.5-5%.

In an embodiment, the material of the electronic conductor encapsulation layer 22 includes at least one of a carbon material and a conductive oxide. In a specific embodiment, the carbon material includes at least one of amorphous carbon, carbon nanotubes, graphite, carbon black, graphene, and the like. In a specific embodiment, the conductive oxide may include at least one of $In_2O_3$, $ZnO$, and $SnO_2$. By adjusting the thickness and material of the electronic conductor encapsulation layer 22, the electronic conductivity can be further improved.

In an embodiment, the above-mentioned ionic conductor encapsulation layer 23 can enhance the ionic conductivity of the functional encapsulation 20, thereby enhancing the ionic conductivity of the lithium-supplementing additive and aiding in the transportation of lithium ions from the core body. At the same time, after the core body 10 as a "sacrificial agent" releases lithium ions, the ionic conductor encapsulation layer 23 can also be exploited to aid in enhancing the ion transmission inside the electrode. Based on the effect of the ionic conductor encapsulation layer 23, when the functional encapsulation layer 20 only includes an ionic conductor encapsulation layer 23, the ionic conductor encapsulation layer 23 should have a dense structure and full coverage; when the functional encapsulation layer 20 includes at least an ionic conductor encapsulation layer 23 and an electronic conductor encapsulation layer 22, the ionic conductor encapsulation layer 23 has a partial-coverage structure and a non-dense structure, but the composite coating layer constituted by the ionic conductor encapsulation layer 23 and the electronic conductor encapsulation layer 22 should have the ability to isolate harmful compositions such as moisture and carbon dioxide. In an embodiment, the thickness of the ionic conductor encapsulation layer 23 is 1-200 nm, further is 1-50 nm, and still further is 2-20 nm. In another embodiment, the material of the ionic conductor encapsulation layer 23 includes at least one of perovskite type, NASICON type and garnet type. In a specific embodiment, the perovskite type includes $Li_{3x}La_{2/3-x}TiO_3$ (LLTO), and specifically, at least one of $Li_{0.5}La_{0.5}TiO_3$, $Li_{0.33}La_{0.57}TiO_3$, $Li_{0.29}La_{0.57}TiO_3$, $Li_{0.33}Ba_{0.25}La_{0.39}TiO_3$, $(Li_{0.33}La_{0.56})_{1.005}Ti_{0.99}Al_{0.0103}$, and $Li_{0.5}La_{0.5}Ti_{0.95}Zr_{0.05}O_3$, the NASICON type includes, but is not limited to, $Li_{1.4}Al_{0.4}Ti_{1.6}(PO_4)_3$ (LATP). The garnet type includes at least one of $Li_7La_3Zr_2O_{12}$ (LLZO), $Li_{6.4}La_3Zr_{1.4}Ta_{0.6}O_{12}$, and $Li_{6.5}La_3Zr_{1.5}Ta_{0.5}O_{12}$. By adjusting the thickness and material of the ionic conductor encapsulation layer 23, the ion conductivity can be further improved.

In addition, other layer structures may be provided on the outer surface of functional encapsulation layer 20 as required, for example, including but not limited to coating layers such as conductive organic matter which, for example, constitutes a composite coating layer together with at least one of the above-mentioned electronic conductor encapsulation layer 22 and ionic conductor encapsulation layer 23. When other coating layers include a conductive organic coating layer, the conductive organic coating layer is coated on the outer surfaces of the electronic conductor encapsulation layer 22 and the ionic conductor encapsulation layer 23.

Based on the above-mentioned embodiments, after testing, the particle sizes of the lithium-supplementing additives in the embodiments of the present application are basically $0.2 \ \mu m \leq D50 \leq 10 \ \mu m$, and further are $1 \ \mu m \leq D50 \leq 10 \ \mu m$; $D10/D50 \geq 0.3$, $D90/D50 \leq 2$. The specific surface area of the lithium-supplementing additives may be controlled such that $0.5 \leq BET \leq 20 \ m^2/g$. Therefore, the particle size of the lithium-supplementing additive in the embodiment of the present application is controllable and uniform, and the surface thereof, that is, the coating layer, is dense.

Figure 6:
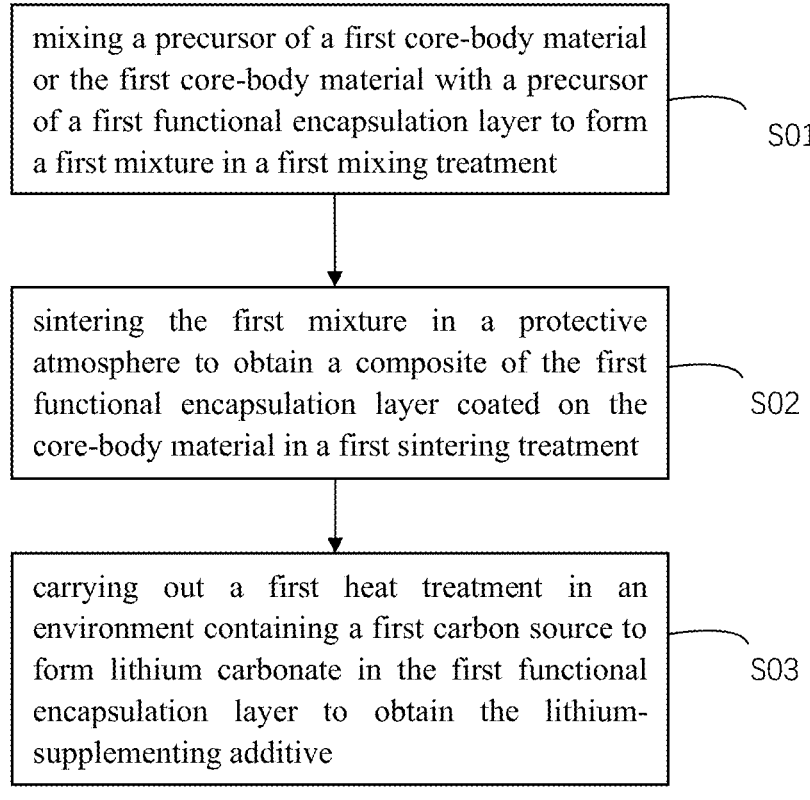
FIG. 6 is a flow chart of a preparation method of the lithium-supplementing additive of an embodiment of the present application.

In a second aspect, the embodiments of the present application further provide a preparation method of the above-mentioned lithium-supplementing additive. In the embodiments, the process flow of the preparation method in this embodiment is as shown in FIG. 6, including the following steps:

Step S01: a first mixing treatment: a first core-body precursor or a first core-body material is mixed with a first functional-encapsulation-layer precursor to form a first mixture;

Step S02: a first sintering treatment: the first mixture is sintered in a protective atmosphere to obtain a composite where the first functional encapsulation layer is coated on the core-body material; and Step S03: the composite is subjected to a first heat treatment in an environment containing a first carbon source, and lithium carbonate is generated in the first functional encapsulation layer to obtain the lithium-supplementing additive.

The first core-body precursor in step S01 is a precursor for forming the first core-body material, and the first core-body material in step S01 is the material contained in the core body 10 of the lithium-supplementing additive in the above embodiments of the present application. Therefore, the first core-body precursor includes the precursor of the lithium-supplementing material contained in the core body 10 of the lithium-supplementing additive in the above embodiments of the present application (herein referred to as the first core-body precursor), the first core-body material includes the lithium-supplementing material contained in the core body 10 of the lithium-supplementing additive in the above embodiments of the present application.

The first functional-encapsulation-layer precursor in step S01 is a material that forms the functional encapsulation layer 20 contained in the lithium-supplementing additive in the above embodiments of the present application. Therefore, the type of the first functional-encapsulation-layer precursor may be selected according to the material of the first functional encapsulation layer.

For conciseness, material types of the first core-body precursor or the core-body material and the first functional-encapsulation-layer precursor in step S01 are not described in detail here.

In the first sintering treatment in step S02, when the first mixture contains the first core-body precursor, the first core-body material is generated by the first core-body precursor in the first mixture, thus the lithium-supplementing material in the core body 10 of the lithium-supplementing additive in the above-mentioned embodiments of the present application is formed. At the same time, the functional encapsulation layer 20 of the lithium-supplementing additive in the above-mentioned embodiments of the present application is formed by the first functional-encapsulation-layer precursor.

In the embodiments, the temperature of the first sintering treatment is $450° \text{C}.-1000° \text{C}.$, the first sintering treatment at this temperature allows the first core-body precursor and/or the first functional-encapsulation-layer precursor to fully react to form the core body material and/or the first functional encapsulation layer material, the duration for the first sintering treatment is controlled to be, for example, 0.5-10 h.

In a further embodiment, the first sintering treatment may be heated to $450° \text{C}.-1000° \text{C}.$ at a rate of $100-500° \text{C}./h$. By controlling and adjusting the heating rate of the first sintering treatment, the integrity of the coating structure and the denseness of the first functional encapsulation layer of the resulting lithium-supplementing additive are improved.

In addition, when the first functional encapsulation layer of the prepared lithium-supplementing additive has a composite layer structure as shown in FIGS. 3 to 5, according to the above-mentioned step S01 and step S02, a composite lithium-supplementing material with a composite layer structure corresponding to each layer of the precursor coating layer covering the core body 10 may be formed in situ, and then the composite lithium-supplementing material is sintered again. Of course, chemical deposition or physical deposition can also be used to sequentially form the layer structure in the composite layer structure on the surface of the core body 10.

In the embodiments, the protective atmosphere may be the atmosphere formed by any protective gas of nitrogen, argon, nitrogen-argon mixed gas, nitrogen-hydrogen mixed gas, and argon-hydrogen mixed gas, and the protective atmosphere can effectively ensure the stability of the crystal structure and electrochemical performance of the composite formed in the first sintering treatment.

In step S03, the first heat treatment to the composite in step S03 is carried out, so that the first carbon source can chemically react with the residual alkali contained in the composite formed in step S02 during the first heat treatment, and the resulting products including lithium carbonate. Therefore, the temperature of the first heat treatment is at least a temperature that can ensure the formation of lithium carbonate. In the embodiments, for example, the temperature of the first heat treatment may be $400-800° \text{C}.$, and the duration is 2-10 h. By controlling the temperature and other conditions of the first heat treatment, the first carbon source can fully react with the residual alkali in the composite, thereby reducing the content of residual alkali. The generated products include at least lithium carbonate so that the effects of lithium carbonate in the lithium-supplementing additive as described above can be achieved.

In a specific embodiment, the first carbon source includes at least one of carbon dioxide, $C_1$-$C_4$ alcohols, $C_1$-$C_4$ ethers, $C_1$-$C_4$ ketones, and $C_1$-$C_4$ hydrocarbon compounds. These types of first carbon sources are capable of providing carbon and reacting with the residual alkali in the composite. In addition, these first carbon sources can effectively form a gaseous state, so as to effectively enter the coating layer of the composite during the heat treatment process and fully react with the residual alkali in the composite to generate lithium carbonate, thereby reducing the residual alkali content in the composite.

In addition, after step S03, other layer structures may be further formed on the outer surface of the first functional encapsulation layer that is heat treated in step S03 according to due needs. Other layer structures may include, but are not limited to, a coating layer such as a conductive organic layer, which, for example, forms a composite coating layer structure with at least one of the above-mentioned electronic conductor encapsulation layer 22 and ionic conductor encapsulation layer 23. When other coating layers include a conductive organic coating layer, the conductive organic coating layer is coated on the outer surfaces of the electronic conductor encapsulation layer 22 and the ionic conductor encapsulation layer 23 and may be formed by in-situ mixing treatment, spray drying, and the like.

Figure 7:
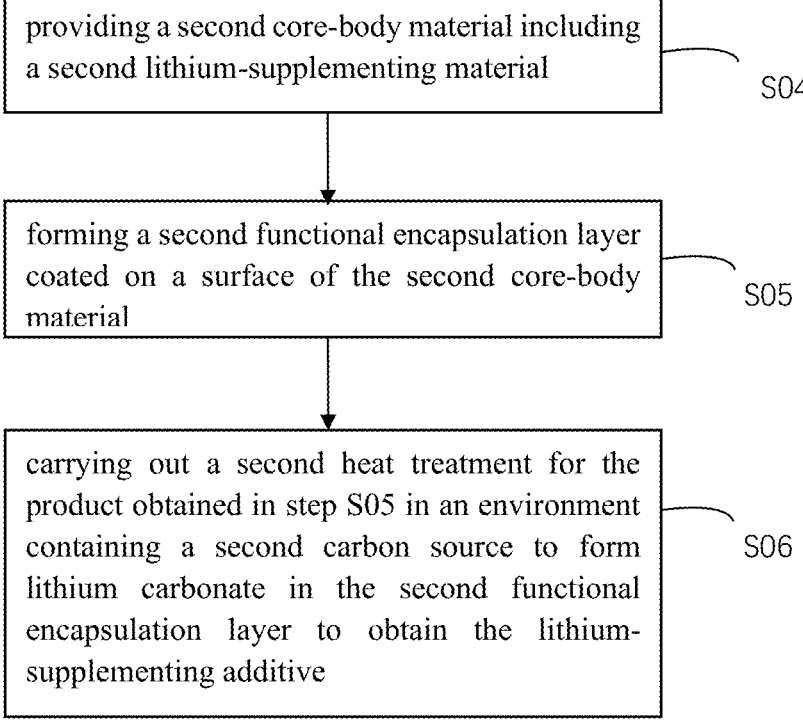
FIG. 7 is a flow chart of another preparation method of the lithium-supplementing additive of an embodiment of the present application.

In other embodiments, the process flow of another preparation method in an embodiment of the present application is as shown in FIG. 7, including the following steps:

Step S04: a second core body material including a second lithium-supplementing material is provided;

Step S05: a second functional encapsulation layer covering the second core body material is formed on the surface of the second core body material; and Step S06: the product obtained in step S05 is subjected to a second heat treatment in an environment containing a second carbon source to generate lithium carbonate in the second functional encapsulation layer, and the lithium-supplementing additive is obtained.

The second core body material in step S04 is the material of the core body 10 of the lithium-supplementing additive in the above embodiments of the present application, thus the second lithium-supplementing material is the lithium-supplementing material in the core body 10 of the lithium-supplementing additive in the above embodiments of the present application. The second functional encapsulation layer formed in step S05 is also the functional encapsulation layer 20 of the lithium-supplementing additive in the above embodiments of the present application. For conciseness, the types of the second lithium-supplementing material and the second core body material in step S04 and the second functional encapsulation layer formed in step S05 will not be repeated here.

In addition, the method for forming the second functional encapsulation layer in step S05 may be in-situ coating, chemical vapor deposition, or physical vapor deposition. The formed second functional encapsulation layer structure may have the structure as that of the functional encapsulation layer 20 of the lithium-supplementing additive in the above-mentioned embodiments of the present application, such as the composite coating layer structure shown in FIGS. 3 to 5, in which each layer structure may be formed in sequence.

In step S06, the second heat treatment is carried out to the composite obtained in step S05, thus the second carbon source can chemically react with the residual alkali in the composite formed by the second functional encapsulation layer and core body material in step S05, and the generated products include lithium carbonate. Therefore, the temperature of the second heat treatment is at least a temperature that can ensure the formation of lithium carbonate. The conditions of the second heat treatment may be the same as or different from the conditions of the above first heat treatment. In the embodiments, the temperature of the second heat treatment may be 400-800° C., and the duration may be 2-10 h. By controlling the temperature and other conditions of the second heat treatment, the second carbon source can fully react with the residual alkali in the composite that formed in step S05, thereby reducing the content of residual alkali. The generated products include at least lithium carbonate, so that the effects of lithium carbonate in the lithium-supplementing additive as described above can be achieved.

the second carbon source may be the same as or different from the first carbon source mentioned above. In specific embodiments, the second carbon source includes at least one of carbon dioxide, $C_1$-$C_4$ alcohols, $C_1$-$C_4$ ethers, $C_1$-$C_4$ ketones, and $C_1$-$C_4$ hydrocarbon compounds. These types of second carbon sources are capable of providing carbon and reacting with the residual alkali in the composite formed in step S05. In addition, these second carbon sources can effectively form a gaseous state, so as to effectively enter the coating layer of the composite during the heat treatment and fully react with the residual alkali in the composite to generate lithium carbonate, thereby reducing the residual alkali content in the composite.

In addition, after step S06, other layer structures may be further formed on the outer surface of the second functional encapsulation layer that is heat treated in step S05 according to due needs. Other layer structures may include, but are not limited to, a coating layer such as a conductive organic layer, which, for example, forms a composite coating layer structure with at least one of the above-mentioned electronic conductor encapsulation layer 22 and ionic conductor encapsulation layer 23. When other coating layers include a conductive organic coating layer, the conductive organic coating layer is coated on the outer surfaces of the electronic conductor encapsulation layer 22 and the ionic conductor encapsulation layer 23 and may be formed by in-situ mixing treatment, spray drying, and the like.

Therefore, the above-mentioned preparation method of the lithium-supplementing additive can effectively prepare the lithium-supplementing additive of the present application and allows the functional encapsulation layer containing lithium carbonate to effectively coat the core body containing the lithium-supplementing material. The lithium-supplementing additive prepared has a low residual alkali content or even eliminates the residual alkali content, and includes a dense functional encapsulation layer. Therefore, the lithium-supplementing additive prepared has excellent lithium supplement effect, stable lithium supplement performance, and good processibility. Moreover, the relative performance of the lithium-supplementing additive prepared can be optimized by controlling the materials and process conditions of the core body and the functional encapsulation layer can. In addition, the preparation method of the lithium-supplementing additive can ensure a stable structure and electrochemical performance, high efficiency, and low production costs of the lithium-supplementing additive.

In a third aspect, an embodiment of the present application further provides an electrode sheet, which includes a current collector and an electrode active layer bonded to a surface of the current collector. The electrode active layer is doped with the above-mentioned lithium-supplementing additive of the present application. The electrode sheet of the present application contains the lithium-supplementing additive of the present application, therefore, during charge and discharge process, the lithium-supplementing additive included therein can serve as a lithium source and a "sacrificial agent" during the initial charging cycle to compensate for lithium ions that are irreversibly consumed by the formation of the SEI film on the anode, thereby maintaining the abundance of lithium ions in the battery system and improves the initial efficiency and the overall electrochemical performance of the battery.

The electrode sheet may be a conventional electrode sheet of a secondary battery, such as those including a current collector and an electrode active layer bonded on the surface of the current collector.

In an embodiment, the mass content of the lithium-supplementing additive according to the embodiments of the present application within the electrode active layer may be 0.1-20 wt %; preferably, 0.1-8 wt %. The electrode active layer includes, in addition to the lithium-supplementing additive, an electrode active material, a binding agent and a conductive agent. The binding agent may be a conventional electrode binding agent, such as one or more of polyvinylidene chloride, soluble polytetrafluoroethylene, polymerized styrene butadiene rubber, hydroxypropyl methyl cellulose, methyl cellulose, carboxymethyl cellulose, polyvinyl alcohol, acrylonitrile copolymer, sodium alginate, chitosan, and chitosan derivatives. In the embodiments of the present application, the conductive agent may be a conventional conductive agent, such as one or more of graphite, carbon black, acetylene black, graphene, carbon fiber, C60, and carbon nanotube. The electrode active material may be a corresponding cathode active material or anode active material selected according to the type of the electrode such as cathode and anode. The cathode active material includes one or more of lithium cobalt oxide, lithium manganate, lithium iron phosphate, lithium vanadium phosphate, lithium vanadyl phosphate, lithium vanadium fluorophosphate, lithium titanate, lithium nickel manganese cobalt oxides, and lithium nickel cobalt aluminum oxides. Meanwhile, the type of the above-mentioned lithium-supplementing additive is compatible with the type of the electrode active material, for example, when the electrode active material is a cathode active material, then the above-mentioned lithium-supplementing additive is suitable for use as a cathode lithium-supplementing additive; when the electrode active material is an anode active material, then the above-mentioned lithium-supplementing additive is suitable for use as an anode lithium-supplementing additive.

In an embodiment, the preparation of the electrode sheet is as follows: mixing the electrode active material, the lithium-supplementing additive, the conductive agent and the binding agent to obtain an electrode slurry, coating the electrode slurry on the current collector, and drying, rolling, die-cutting etc. to obtain a cathode sheet.

In a fourth aspect, an embodiment of the present application further provides a secondary battery, which includes essential components such as a cathode sheet, an anode sheet, a separator and an electrolyte, and other necessary or auxiliary components. The cathode/anode sheet is the cathode/anode sheet according to the above embodiments of the present application, that is, the cathode active layer in the cathode sheet contains the lithium-supplementing additive according to the above embodiments of the present application, and the anode active layer in the anode sheet contains the lithium-supplementing additive according to the above embodiments of the present application.

The secondary battery according to the embodiment of the present application contains the lithium-supplementing additive according to the above embodiments of the present application, due to the outstanding lithium-supplementing performance or the further ion and/or electron conductivity of the lithium-supplementing additive, the secondary battery according to the embodiment of the present application exhibits excellent initial Coulombic efficiency and battery capacity, cycle performance, long service life, and stable electrochemical performance.

The exemplary lithium-supplementing additives, the preparation method and application thereof are illustrated with the following examples.

1. Examples of the Lithium-Supplementing Additive and the Preparation Method Thereof

Example 1

The present example provides a lithium-supplementing additive and a preparation method therefor. The lithium-supplementing additive includes a $LiFeO_2 \cdot 1.99Li_2O$ lithium-supplementing core body and a dense carbon layer covering the core body. The average particle size of the core body is 500 nm, the thickness of the dense carbon layer is 40 nm, and lithium carbonate is dispersed in the dense carbon layer, the specific surface area is 9.4 $m^2/g$, and the measured resistivity is 400 $\Omega/cm$.

A preparation method for the lithium-supplementing additive of the present example includes the following steps:

S1: $Fe(NO_3)_3 \cdot 9H_2O$, $LiNO_3$ and $LiNO_3$ were added to 15 wt % citric acid aqueous solution at a molar ratio of 1:4.98 and mixed well, the mixture was spray-dried at 280° C. followed by crushing;

S2: a resulting mixture was heated to 850° C. at a rate of 300° C./h in a nitrogen atmosphere and held for 15 h. After cooling, the product was mechanically crushed and classified to obtain in-situ carbon-coated $LiFeO_2 \cdot 1.99Li_2O$ powder; and S3: the in-situ carbon-coated $LiFeO_2 \cdot 1.99Li_2O$ powder was placed in a rotary furnace under the protection of 80% vol $N_2/CO_2$, the temperature was heated to 500° C. at a heating rate of 200° C./h and held for 1 h, then cooled down to obtain lithium carbonate-doped carbon-coated $LiFeO_2 \cdot 1.99Li_2O$ powder.

Example 2

The present example provides a lithium-supplementing additive and a preparation method therefor. The lithium-supplementing additive includes a $LiFeO_2 \cdot 1.99Li_2O \cdot 0.005Al_2O_3$ lithium-supplementing core body and a dense carbon layer covering the core body. The average particle size of the core body is 800 nm, the thickness of the dense carbon layer is 100 nm, and lithium carbonate is dispersed in the dense carbon layer, the specific surface area is 5.2 $m^2/g$, and the measured resistivity is 300 $\Omega/cm$.

A preparation method for the lithium-supplementing additive of the present example includes the following steps:

S1: $Fe(NO_3)_3 \cdot 9H_2O$, $LiNO_3$ and $Al(NO_3)_3$ were added to 15 wt % citric acid aqueous solution at a molar ratio of 1:4.98:0.01 and mixed well, the mixture was spray-dried at 280° C. followed by crushing; and S2: a resulting mixture was heated to 850° C. at a rate of 300° C./h in 80% vol $N_2/CO_2$ and held for 15 h, after cooling, the product was mechanically crushed and classified to obtain the lithium carbonate & carbon combine-coated $LiFeO_2 \cdot 1.99Li_2O \cdot 0.005Al_2O_3$ powder.

Example 3

The present example provides a lithium-supplementing additive and a preparation method therefor. The lithium-supplementing additive includes a $LiFeO_2 \cdot 1.99Li_2O \cdot 0.01CuO$ lithium-supplementing core body and a dense carbon layer covering the core body. The average particle size of the core body is 200 nm, the thickness of the dense carbon layer is 100 nm, and lithium carbonate is dispersed in the dense carbon layer, the specific surface area is 15 $m^2/g$, and the measured resistivity is 52 $\Omega$/cm.

A preparation method for the lithium-supplementing additive of the present example includes the following steps:

S1: $Fe_2O_3$, LiOH, and CuO were mixed well at a molar ratio of 1:9.96:0.02;

S2: a resulting mixture was heated to 900° C. at a rate of 300° C./h in $N_2$ and held for 20 h, after cooling, the product was mechanically crushed and classified to obtain the $LiFeO_2 \cdot 1.99Li_2O \cdot 0.01CuO$ powder; and S3: the powder obtained after crushing was placed in a rotary furnace under the protection of 80% vol $N_2/CO_2$, the temperature was heated to 900° C. at a heating rate of 200° C./h and held for 1 h with the addition of acetylene at 1 L/min, and cooled down to obtain the lithium carbonate & carbon combine-coated $LiFeO_2 \cdot 1.99Li_2O \cdot 0.01CuO$ powder.

Example 4

The present example provides a lithium-supplementing additive and a preparation method therefor. The lithium-supplementing additive includes a $LiFeO_2 \cdot 1.99Li_2O \cdot 0.005Al_2O_3$ lithium-supplementing core body and a dense carbon layer covering the core-body. The average particle size of the core body is 1.2 $\mu$m, the thickness of the dense carbon layer is 45 nm, and lithium carbonate is dispersed in the dense carbon layer, the specific surface area is 5.2 $m^2/g$, and the measured resistivity is 253 $\Omega$/cm.

A preparation method for the lithium-supplementing additive of the present example includes the following steps:

S1: $Fe(NO_3)_3 \cdot 9H_2O$, $LiNO_3$ and $Al(NO_3)_3$ were added to 15 wt % citric acid aqueous solution at a molar ratio of 1:4.98:0.01 and mixed well, the mixture was spray-dried at 280° C. followed by crushing;

S2: a resulting mixture was heated to 850° C. at a rate of 300° C./h in an air atmosphere and held for 15 h, after cooling, the product was mechanically crushed and classified to obtain in-situ carbon-coated $LiFeO_2 \cdot 1.99Li_2O \cdot 0.005Al_2O_3$ powder; and S3: the powder obtained after crushing was placed in a rotary furnace under the protection of $N_2$, the temperature was heated to 700° C. at a heating rate of 200° C./h and held for 1 h with the addition of acetylene at 1 L/min and 80% vol $N_2/CO_2$ at 20 L/min, then cooled down to obtain the carbon-coated $LiFeO_2 \cdot 1.99Li_2O \cdot 0.005Al_2O_3$ powder.

Example 5

The present example provides a lithium-supplementing additive and a preparation method therefor. The lithium-supplementing additive includes a $LiFeO_2 \cdot 2.025Li_2O \cdot 0.01CuO$ lithium-supplementing core body and a dense carbon layer covering the core-body. The average particle size of the core body is 2 $\mu$m, the thickness of the dense carbon layer is 150 nm, and lithium carbonate is dispersed in the dense carbon layer, the specific surface area is 4.1 $m^2/g$, and the measured resistivity is 130 $\Omega$/cm.

A preparation method for the lithium-supplementing additive of the present example includes the following steps:

S1: $Fe_2O_3$, LiOH, and CuO were mixed well at a molar ratio of 1:10.1:0.01;

S2: a resulting mixture was heated to 900° C. at a rate of 300° C./h in $N_2$ and held for 20 h, after cooling, the product was mechanically crushed and classified to obtain the $LiFeO_2 \cdot 2.025Li_2O \cdot 0.01CuO$ powder; and S3: the powder obtained after crushing was placed in a rotary furnace under the protection of $N_2$, the temperature was heated to 900° C. at a heating rate of 200° C./h and held for 2 h with the addition of acetone at 1 L/min and 80% vol $N_2/CO_2$ at 20 L/min, and was cooled down to obtain the lithium carbonate & carbon combine-coated $LiFeO_2 \cdot 2.025Li_2O \cdot 0.01CuO$ powder.

Example 6

The present example provides a lithium-supplementing additive and a preparation method therefor. The lithium-supplementing additive includes a $LiFeO_2 \cdot_{2.025}Li_2O \cdot 0.01MnO$ lithium-supplementing core body and a dense carbon layer covering the core body. The average particle size of the core body is 750 nm, the thickness of the dense carbon layer is 80 nm, and lithium carbonate is dispersed in the dense carbon layer, the specific surface area is 6.7 $m^2/g$, and the measured resistivity is 290 $\Omega$/cm.

A preparation method for the lithium-supplementing additive of the present example includes the following steps:

S1: $Fe_2O_3$, LiOH, and $MnO_2$ were mixed well at a molar ratio of 1:10.1:0.01;

S2: a resulting mixture was heated to 900° C. at a rate of 300° C./h in $N_2$ and held for 20 h, after cooling, the product was mechanically crushed and classified to obtain the $LiFeO_2 \cdot 2.025Li_2O \cdot 0.01MnO$ powder; and S3: the powder obtained after crushing was placed in a rotary furnace under the protection of $N_2$, the temperature was heated to 700° C. at a heating rate of 200° C./h and held for 5 h with the addition of ethanol at 1 L/min and 80% vol $N_2/CO_2$ at 20 L/min, and was cooled down to obtain the lithium carbonate & carbon combine-coated $LiFeO_2 \cdot 2.025Li_2O \cdot 0.01MnO$ powder.

Comparative Example 1

The present comparative example provides a lithium-supplementing additive and a preparation method therefor. The lithium-supplementing additive includes a $LiFeO_2 \cdot 1.99Li_2O$ lithium-supplementing material without the carbon coating layer.

A preparation method for the lithium-supplementing additive of the present comparative example includes the following steps:

S1: $Fe(NO_3)_3 \cdot 9H_2O$ and $LiNO_3$ were added to 15 wt % citric acid aqueous solution at a molar ratio of 1:4.98 and mixed well, the mixture was spray-dried at 280° C. followed by crushing; and S2: a resulting mixture was heated to 850° C. at a rate of 300° C./h in an air atmosphere and held for 15 h, after cooling, the product was mechanically crushed and classified to obtain the $LiFeO_2 \cdot 1.99Li_2O$ powder.

Comparative Example 2

The present comparative example provides a lithium-supplementing additive and a preparation method therefor. The lithium-supplementing additive includes a $LiFeO_2 \cdot 1.99Li_2O$ lithium-supplementing core body and a dense carbon layer covering the core body, no lithium carbonate in the dense carbon layer.

A preparation method for the lithium-supplementing additive of the present comparative example includes the following steps:

S1: $Fe(NO_3)_3 \cdot 9H_2O$ and $LiNO_3$ were added to 15 wt % citric acid aqueous solution at a molar ratio of 1:4.98 and mixed well, the mixture was spray-dried at 280° C. followed by crushing; and S2: a resulting mixture was heated to 850° C. at a rate of 300° C./h in a nitrogen atmosphere and held for 15 h, after cooling, the product was mechanically crushed and classified to obtain the in-situ carbon-coated $LiFeO_2 \cdot 1.99Li_2O$ powder.

Comparative Example 3

The present comparative example provides a lithium-supplementing additive and a preparation method therefor. The lithium-supplementing additive includes a $LiFeO_2 \cdot 1.99Li_2O \cdot 0.005Al_2O_3$ lithium-supplementing core body and a dense carbon layer covering the core body, no lithium carbonate in the dense carbon layer.

A preparation method for the lithium-supplementing additive of the present comparative example includes the following steps:

S1: $Fe(NO_3)_3 \cdot 9H_2O$, $LiNO_3$ and $Al(NO_3)_3$ were added to 40 wt % citric acid aqueous solution at a molar ratio of 1:4.98:0.01 and mixed well, the mixture was spray-dried at 280° C. followed by crushing; and S2: a resulting mixture was heated to 850° C. at a rate of 300° C./h in a nitrogen atmosphere and held for 15 h, after cooling, the product was mechanically crushed and classified to obtain the in-situ carbon-coated $LiFeO_2 \cdot 1.99Li_2O \cdot 0.005Al_2O_3$ powder.

Comparative Example 4

The present comparative example provides a lithium-supplementing additive and a preparation method therefor. The lithium-supplementing additive includes a $LiFeO_2 \cdot 1.99Li_2O \cdot 0.005Al_2O_3$ lithium-supplementing core body and a lithium carbonate layer covering the core body.

A preparation method for the lithium-supplementing additive of the present comparative example includes the following steps:

S1: $Fe(NO_3)_3 \cdot 9H_2O$, $LiNO_3$ and $Al(NO_3)_3$ were added to 40 wt % citric acid aqueous solution at a molar ratio of 1:4.98:0.01 and mixed well, the mixture was spray-dried at 280° C. followed by crushing; and S2: a resulting mixture was heated to 850° C. at a rate of 300° C./h in an air atmosphere and held for 15 h, after cooling, the product was mechanically crushed and classified to obtain the in-situ carbon-coated $LiFeO_2 \cdot 1.99Li_2O \cdot 0.005Al_2O_3$ powder; the powder was heated to 400° C. at a rate of 200° C./h, and held for 1 hour with an introduction of 80% vol $N_2/CO_2$ at 20

L/min, and was cooled down to obtain the lithium carbonate coated $LiFeO_2 \cdot 1.99Li_2O \cdot 0.005Al_2O_3$ powder.

2. Examples of Lithium-Ion Battery

The lithium-supplementing additives provided in the above Examples 1 to 6 and the comparative examples were respectively assembled into cathodes and lithium-ion batteries according to the methods below.

Cathode: the lithium-supplementing additive was mixed with lithium cobaltate at a mass ratio of 5:95 to obtain a mixture, the mixture was then mixed and ball-milled with polyvinylidene fluoride and SP-Li at a mass ratio of 93:3:4 to obtain a cathode slurry. The cathode slurry was coated on the surface of an aluminum foil and was vacuum dried at 110° C. overnight after rolling, to obtain a cathode sheet;

Anode: metal lithium sheet;

Electrolyte: Ethylene carbonate and ethyl methyl carbonate were mixed at a volume ratio of 3:7, and $LiPF_6$ was added to form an electrolyte, the concentration of $LiPF_6$ is 1 mol/L; Separator: Polypropylene microporous separator;

Assembly of the lithium-ion battery: the lithium-ion batteries were assembled in a glove box with an inert atmosphere according to a sequence of metal lithium sheet-separator-electrolyte-cathode sheet.

3. Relevant Performance Test

1. Relevant Tests of the Lithium-Supplementing Additives

1.1 Electron Microscope Analysis of the Lithium-Supplementing Additives

Figure 9:
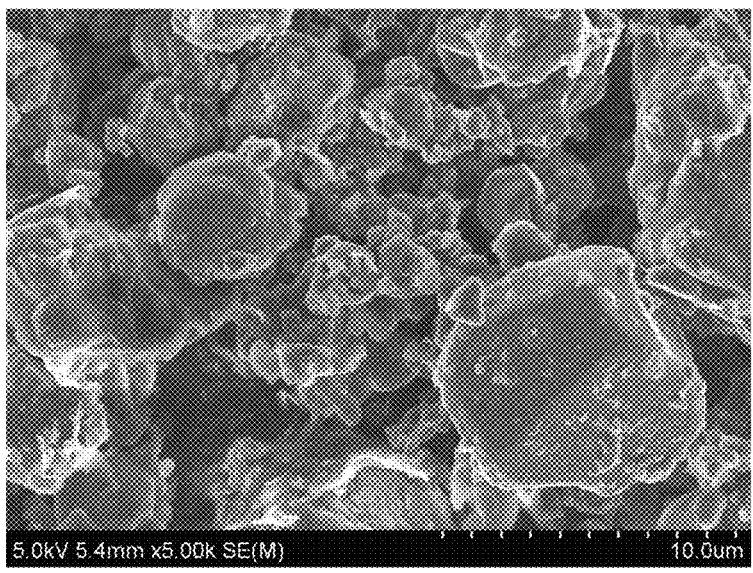
FIG. 9 is an SEM image of the lithium-supplementing additive in Example 5.
Figure 10:
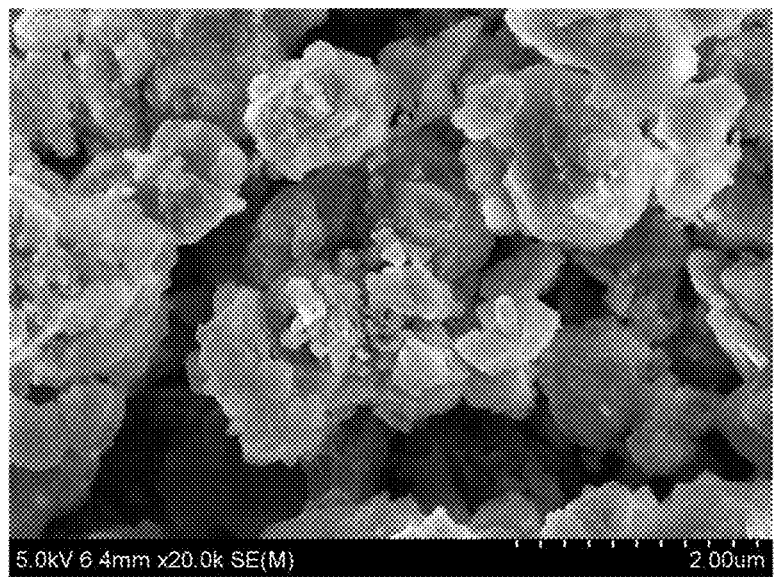
FIG. 10 an SEM image of the lithium-supplementing additive in Comparative Example 1.

The lithium-supplementing additives provided in the above Examples 1 to 6 and the Comparative Examples 1 to 3 were respectively analyzed by the scanning electron microscopy. The SEM images corresponding to Example 1, Example 5, and Comparative Example 1 are respectively shown in FIGS. 8, 9, and 10.

Figure 8:
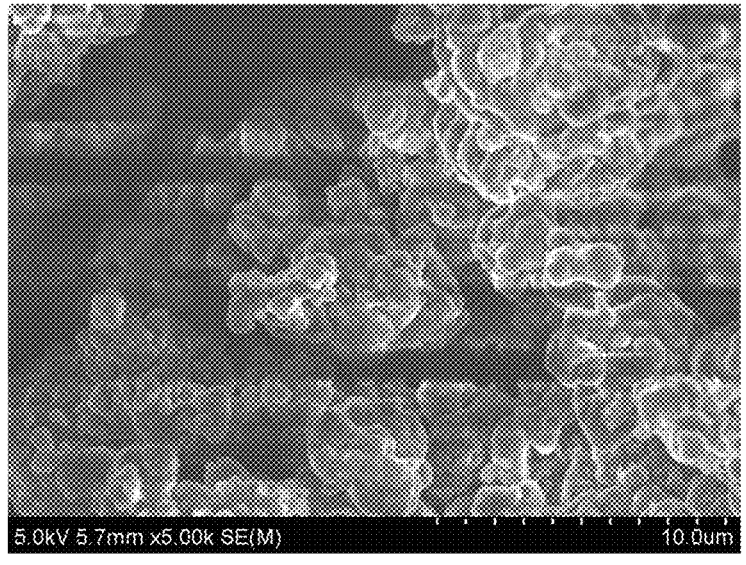
FIG. 8 is an SEM image of the lithium-supplementing additive in Example 1.

As can be seen from FIG. 8, the in-situ carbon-coated lithium-rich iron-based lithium-supplementing additive in Example 1 has more non-standard grains, and the interface is relatively rough. It can be seen from FIG. 9 that the surface of the lithium-rich iron-based lithium-supplementing additive in Example 5 is relatively smooth. It is found from FIG. 10 that the interface of the uncoated lithium-rich iron-based lithium-supplementing additive is also relatively rough. Therefore, after the secondary coating treatment, the surface quality of the lithium-supplementing additive can be effectively improved, and the insulation effect can be improved.

1.2 X-Ray Diffraction (XRD) Characterization of Lithium-Supplementing Additives The lithium-supplementing additives provided in the above Examples 1 to 6 and the Comparative Examples 1 to 3 were respectively analyzed by XRD. The XRD results of Example 5 and Comparative Example 1 are respectively shown in FIGS. 10 and 11.

Figure 11:
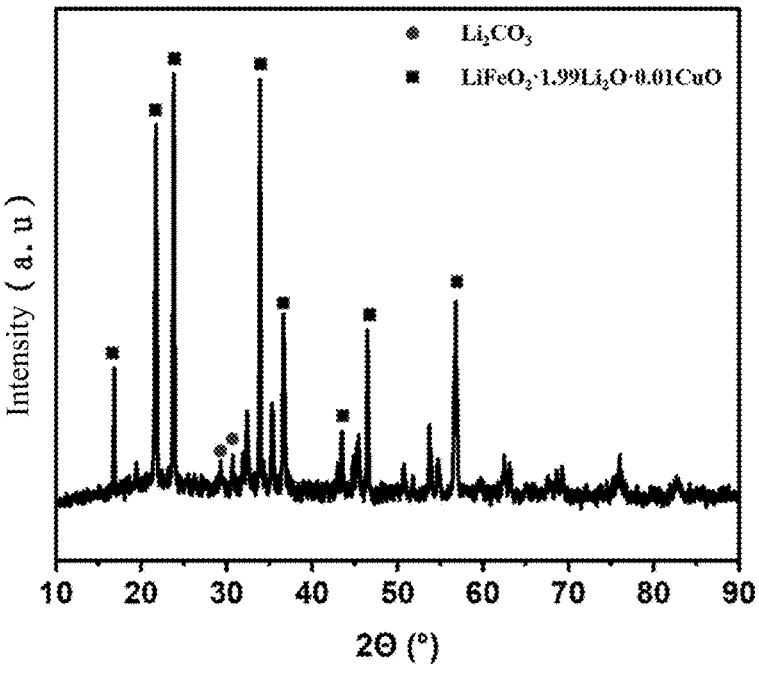
FIG. 11 is an XRD spectrum of the lithium-supplementing additive in Example 5.
Figure 12:
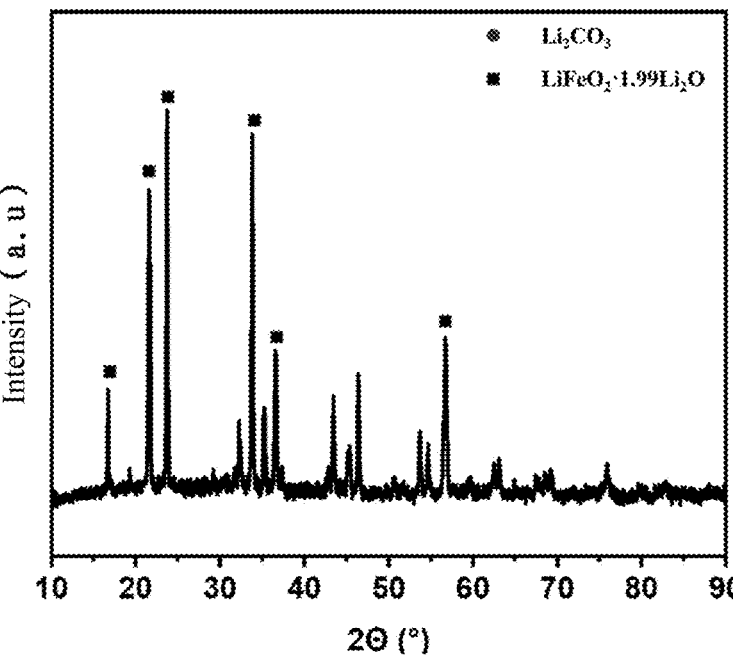
FIG. 12 is an XRD spectrum of the lithium-supplementing additive in Comparative Example 1.

As can be seen from FIG. 11, the lithium-rich iron-based lithium-supplementing material provided by Example 5 has some small diffraction peaks of lithium carbonate, in addition to the main peak of $Li_5FeO_4$. It can be seen from FIG. 12 that the lithium-rich iron-based lithium-supplementing material provided in Comparative Example 1 is mainly $Li_5FeO_4$ without lithium carbonate. The XRD results of Examples 1 to 4, and 6 also confirm the presence of lithium carbonate.

1.3 Content Analysis of the Doping Element M in the Lithium-Supplementing Material of the Lithium-Supplementing Additive Core Body The content of the doping element M in the lithium-supplementing additives provided in the above Examples 1 to 6 and the Comparative Examples 1 to 3 were respectively analyzed using inductively coupled plasma (ICP) luminescence spectrometry. The results are as shown in Table 1, the y value in Table 1 is the content of the doping element M in the lithium-supplementing additive.

2. Examples of the Lithium-Ion Battery

The electrochemical performance of the lithium-ion batteries assembled as in the above examples of the lithium-ion batteries were tested under the following conditions: the assembled battery was placed at room temperature for 24 h and a charge and discharge test was performed. The charge and discharge voltages are 2.7 V-4.3 V. Referring to Table 1 for the electrochemical performance of the lithium secondary batteries corresponding to Examples 1-4 and Comparative Examples 1-3.

and the water absorption in the preparation of the cathode slurry leads to the formation of jelly, which hinders the coating of the cathode slurry.

As can be seen from Example 1 and Comparative Example 2, compared with the single monolayer coating, the composite coating layer of lithium carbonate and carbon has batter electrochemical stability and processibility, and has more active lithium that can be released.

As can be seen from Example 2, Example 4 and Comparative Example 3, the high-content carbon layer not only occupies the contents of active material, but is also unable to fully isolate water, resulting in a reduction in processability. Through the composite coating of lithium carbonate and carbon, the isolation of unfavorable factors such as water can be further improved, and the processability and the stability of lithium supplementation can be significantly enhanced.

As can be seen from Example 2, Example 4 and Comparative Example 4, lithium carbonate can effectively form the composite coating of lithium carbonate and carbon, which further promotes isolation of unfavorable factors such as water and significantly improve processability and the stability of lithium supplement. However, when all the coating layers are replaced with lithium carbonate, since lithium carbonate is an insulator, a certain thickness of lithium carbonate increases the polarization resistance, resulting in poor kinetics of lithium ions, which affects the normal extraction of lithium ions.

TABLE 1

Experimental parameters of the lithium-rich iron-based lithium-supplementing materials and lithium-ion batteries corresponding to Examples 1-8 and Comparative Examples 1-3.

| | Performance Parameters | | | | |
| Example | Y value of doping element M | State of cathode slurry | Carbon coverage (wt %) | Specific capacity in initial charging (mAh/g) | Initial efficiency (%) |
| --- | --- | --- | --- | --- | --- |
| LCO | 0 | Normal | 0 | 167.1 | 95.9 |
| Example 1 | 0 | Normal | 2.5 | 186.2 | 81.7 |
| Example 2 | 0.01 | Normal | 2.8 | 187.7 | 81.1 |
| Example 3 | 0.01 | Normal | 3.0 | 189.6 | 80.3 |
| Example 4 | 0.005 | Normal | 2.2 | 188.7 | 80.65 |
| Example 5 | 0.01 | Normal | 3.5 | 184.6 | 80.9 |
| Example 6 | 0.01 | Normal | 3.7 | 185.3 | 80.6 |
| Comparative Example 1 | 0 | Jelly-like | 0 | 170.3 | 87.7 |
| Comparative Example 2 | 0.01 | Jelly-like after 15 min | 2.3 | 180.2 | 82.8 |
| Comparative Example 3 | 0.01 | Jelly-like after 15 min | 10.8 | 181.2 | 83.9 |
| Comparative Example 4 | 0.01 | Normal | 0 | 175.2 | 89.2 |

As can be seen from Table 1, after the lithium-rich iron-based lithium-supplementing materials in Examples 1-6 of the present application were coated with carbon, the jelly phenomenon does not appear in the cathode slurry prepared, which makes it easy to coat, and when added to the lithium secondary batteries, the cathode can have a higher initial specific capacity and a lower initial efficiency, thereby compensating for the decrease in energy density caused by the irreversible initial lithium loss on the anode.

It can be seen from the experiments of the comparative examples that the lithium-rich iron-based lithium-supplementing material of Comparative Example 1 was not coated, Above embodiment merely show several implementation embodiments of the present application, and the description is comparatively specific and detailed, but cannot therefore be interpreted as the limitation to the scope of the present application. It should be noted that those skilled in the art can make several modifications and improvements without departing from the concept of the present application, and these all belong to the protection scope of the present application. Therefore, the scope of protection of the patent application should be defined by the appended claims.

What is claimed is:

1. A lithium-supplementing additive, comprising:

a core body; and a functional encapsulation layer coated on the core body;

wherein the core body comprises a lithium-supplementing material, and lithium carbonate is dispersed at an interface between the functional encapsulation layer and the core body and in the functional encapsulation layer;

wherein the lithium-supplementing material comprises at least one of lithium-rich transition metal oxides, $Li_wA$, $Li_{1+x+y}Al_xM_yN_zTi_{2-x-y-z}(PO_4)_3$, and lithium metal; and wherein $0<w\leq5$, A is at least one element of C, N, O, P, S, F, B, and Se, N is at least one selected from Si, Ge, and Sn, M is at least one selected from Sc, Ga, Y, and La, and x, y, and z satisfy at least one of $0\leq y\leq0.5$, $0\leq z\leq0.5$, and $0\leq x+y\leq0.5$; and a content of the lithium carbonate at the interface between the functional encapsulation layer and the core body and in a surface layer of the functional encapsulation layer in contact with the core body is greater than a content of the lithium carbonate in a surface layer away from the core body.

2. The lithium-supplementing additive according to claim 1, wherein the lithium carbonate accounts for 0.2-1.5 wt % of the functional encapsulation layer.

3. The lithium-supplementing additive according to claim 1, wherein the lithium carbonate accounts for 0.5-1.5 wt % of the functional encapsulation layer.

4. The lithium-supplementing additive according to claim 1, wherein the lithium-supplementing material comprises at least one of $Li_2MnO_2$, $Li_6MnO_4$, $aLiFeO_2\cdot bLi_2O\cdot cM_xO_y$, $Li_6CoO_4$, $Li_2NiO_2$, $Li_4SiO_4$, $Li_2S$, $Li_3N$, $Li_8SnO_6$, and $Li_{1.3}Al_{0.3}Ti_{1.7}(PO_4)_3$; and wherein in the formula $aLiFeO_2\cdot bLi_2O\cdot cM_xO_y$, $a+b\geq0.98$, $c\leq0.02$, $1.8\leq b/a\leq2.1$, $1\leq y/x\leq2.5$, and Mis at least one of Ni, Co, Mn, Ti, Al, Cu, V, and Zr.

5. The lithium-supplementing additive according to claim 1, wherein a particle size of the core body is 50 nm-10 μm.

6. The lithium-supplementing additive according to claim 1, wherein the functional encapsulation layer comprises a hydrophobic encapsulation layer.

7. The lithium-supplementing additive according to claim 6, wherein the hydrophobic encapsulation layer comprises a conductive carbon coating layer, and the lithium carbonate is distributed in the conductive carbon coating layer and the interface in contact with the core body.

8. The lithium-supplementing additive according to claim 1, wherein a particle size of the lithium-supplementing material is 0.2 μm≤D50≤10 μm, D10/D50≥0.3, D90/D50≤2; and/or a specific surface area of the lithium-supplementing material is 0.5≤BET≤20 m²/g; and/or a resistivity of the lithium-supplementing material is 1.0-500 Ω/cm.

9. A preparation method for a lithium-supplementing additive, comprising:

mixing a precursor of a first core-body material or the first core-body material with a precursor of a first functional encapsulation layer to form a first mixture in a first mixing treatment; sintering the first mixture in a protective atmosphere to obtain a composite of the first functional encapsulation layer coated on the core-body material in a first sintering treatment; and carrying out a first heat treatment in an environment containing a first carbon source to form lithium carbonate in the first functional encapsulation layer to obtain the lithium-supplementing additive according to claim 1, wherein the precursor of the first core-body material comprises a precursor of a first lithium-supplementing material; or providing a second core-body material including a second lithium-supplementing material, and forming a second functional encapsulation layer coated on a surface of the second core-body material; and carrying out a second heat treatment in an environment containing a second carbon source to form lithium carbonate in the second functional encapsulation layer to obtain the lithium-supplementing additive according to claim 1.

10. The preparation method according to claim 9, wherein the first carbon source and/or the second carbon source comprises at least one of carbon dioxide, $C_1$-$C_4$ alcohols, $C_1$-$C_4$ ethers, $C_1$-$C_4$ ketones, and $C_1$-$C_4$ hydrocarbon compounds.

11. The preparation method according to claim 9, wherein a temperature of the first sintering treatment is 450° C.-1000° C., and a duration thereof is 0.5-10 hrs; and/or the temperature of the first sintering treatment increases to 450° C.-1000° C. at a rate of 100-500° C./h; and/or a temperature of the first heat treatment and/or the second heat treatment is 400-800° C., and a duration thereof is 2-10 hrs.

12. An electrode sheet, comprising a current collector and an electrode active layer bonded to a surface of the current collector;

wherein the electrode active layer is doped with the lithium-supplementing additive according to claim 1.

13. A secondary battery, comprising a cathode sheet and an anode sheet, wherein the cathode sheet or the anode sheet is the electrode sheet according to claim 12.

14. The lithium-supplementing additive according to claim 3, wherein a content of the lithium carbonate at the interface between the functional encapsulation layer and the core body and/or in a surface layer of the functional encapsulation layer in contact with the core body is greater than a content of the lithium carbonate in a surface layer away from the core body.

15. The lithium-supplementing additive according to claim 4, wherein the lithium carbonate accounts for 0.2-1.5 wt % of the functional encapsulation layer; and/or a content of the lithium carbonate at the interface between the functional encapsulation layer and the core body and/or in a surface layer of the functional encapsulation layer in contact with the core body is greater than a content of the lithium carbonate in a surface layer away from the core body.

16. The lithium-supplementing additive according to claim 15, wherein the lithium carbonate accounts for 0.5-1.5 wt % of the functional encapsulation layer.

17. The lithium-supplementing additive according to claim 16, wherein the lithium-supplementing material comprises at least one of lithium-rich transition metal oxides, $Li_wA$, $Li_{1+x+y}Al_xM_yN_zTi_{2-x-y-z}(PO_4)_3$, and lithium metal; and wherein $0<w\leq5$, A is at least one element of C, N, O, P, S, F, B, and Se, N is at least one selected from Si, Ge, and Sn, M is at least one selected from Sc, Ga, Y, and La, and x, y, and z satisfy at least one of $0\leq y\leq0.5$, $0\leq z\leq0.5$, and $0\leq x+y\leq0.5$.

18. The lithium-supplementing additive according to claim 1, wherein the content of lithium carbonate gradually decreases as the lithium carbonate spread out in the direction from the inner surface to the outer surface of the functional encapsulation layer.

\* \* \* \* \*